(12) United States Patent
Lin et al.

(10) Patent No.: US 8,316,273 B2
(45) Date of Patent: Nov. 20, 2012

(54) DRIVING CIRCUIT FOR DRIVING READING OPERATION OF OPTICAL DRIVE AND METHOD FOR READING INFORMATION FROM OPTICAL DATA STORAGE MEDIUM

(75) Inventors: Tai-Liang Lin, Keelung (TW);
Shih-Hsin Chen, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 350 days.

(21) Appl. No.: 12/687,955

(22) Filed: Jan. 15, 2010

(65) Prior Publication Data

US 2010/0293430 A1    Nov. 18, 2010

Related U.S. Application Data

(60) Provisional application No. 61/179,044, filed on May 18, 2009.

(51) Int. Cl.
*H03M 13/00*    (2006.01)

(52) U.S. Cl. ........................................ 714/752; 714/770

(58) Field of Classification Search ........................ None
See application file for complete search history.

(56) References Cited

U.S. PATENT DOCUMENTS

| | | | |
|---|---|---|---|
| 6,023,387 A * | 2/2000 | Stenfort | 360/53 |
| 7,079,458 B2 * | 7/2006 | Okazaki et al. | 369/47.34 |
| 7,793,201 B1 * | 9/2010 | Ulriksson | 714/794 |
| 2002/0196718 A1 * | 12/2002 | Okazaki et al. | 369/47.34 |
| 2008/0244368 A1 * | 10/2008 | Chin et al. | 714/800 |
| 2010/0174954 A1 * | 7/2010 | Karabed et al. | 714/704 |

* cited by examiner

*Primary Examiner* — Guerrier Merant
(74) *Attorney, Agent, or Firm* — McClure, Qualey & Rodack, LLP

(57) ABSTRACT

The invention provides a method for reading information of an optical data storage medium. First, one sector of the optical data storage medium is obtained. The sector is then decoded to check if the sector is reliable. When the sector is not reliable, a data rescue process referring to spec-defined or pre-defined information of the physical specification of the sector is performed in order to obtain disc fundamental information of the optical data storage medium.

18 Claims, 13 Drawing Sheets

| Byte position | Contents | Number of bytes |
|---|---|---|
| 0 to 1 | DDS Identifier | 2 |
| 2 | Reserved | 1 |
| 3 | Disk certification flag | 1 |
| 4 to 7 | DDS/PDL update count | 4 |
| 8 to 9 | Number of groups | 2 |
| 10 to 11 | Number of zones | 2 |
| 12 to 79 | Reserved | 68 |
| 80 to 87 | Location of primary spare area | 8 |
| 88 to 91 | Location of LSN0 | 4 |
| 92 to 255 | Reserved | 164 |
| 256 to 259 | Start LSN for Zone 0 | |
| 260 to 263 | Start LSN for Zone 1 | 140 |
| ... | ... | |
| 392 to 395 | Start LSN for Zone 34 | |
| 396 to 2047 | Reserved | 1652 |

FIG. 3

| Pre-pit data Frame number | Bit Position | | |
|---|---|---|---|
| | 0 | 1 to 4 | 5 (msb) to 12(lsb) |
| 0 | Pre-pit SYNC Code | 0000 | First byte of ECC block address | Part A
| 1 | | 0001 | Second byte of ECC block address |
| 2 | | 0010 | Third byte of ECC block address |
| 3 | | 0011 | First byte of parity A |
| 4 | | 0100 | Second byte of parity A |
| 5 | | 0101 | Third byte of parity A |
| 6 | | 0110 | Field ID (00) | Part B
| 7 | | 0111 | First byte of ECC block address |
| 8 | | 1000 | Second byte of ECC block address |
| 9 | | 1001 | Third byte of ECC block address |
| 10 | | 1010 | Set to (00) |
| 11 | | 1011 | Set to (00) |
| 12 | | 1100 | Set to (00) |
| 13 | | 1101 | First byte of parity B |
| 14 | | 1110 | Second byte of parity B |
| 15 | | 1111 | Third byte of parity B |

DRIVING CIRCUIT FOR DRIVING READING OPERATION OF OPTICAL DRIVE AND METHOD FOR READING INFORMATION FROM OPTICAL DATA STORAGE MEDIUM

CROSS REFERENCE TO RELATED APPLICATIONS

This application claims the benefit of U.S. Provisional Application No. 61/179,044, filed May 18, 2009, the entirety of which is incorporated by reference herein.

BACKGROUND OF THE INVENTION

1. Field of the Invention

The invention relates to optical data storage medium accessing, and more particularly to reading of optical data storage medium by referencing specifications of the optical data storage medium.

2. Description of the Related Art

A lot of basic information for accessing an optical disc is recorded on a lead-in area or lead-out area of the optical disc. The basic information is referred to as disc fundamental information. The format and structure of disc fundamental information is defined by the physical specification of optical disc. When the optical disc is inserted into an optical drive, the optical drive must first read the lead-in area or lead-out area to obtain the disc fundamental information. The optical drive can then identify the layout of user data and access the optical disc according to the disc fundamental information. In case of BD-RE, the content of DDS and DFL in DMA area is disc fundamental information. If reading the disc fundamental information has errors, the optical drive cannot identify the layout of user data and access the optical disc correctly, and a disc mount failure is reported to host or a user.

To resist the interference of channel noise or external noise, the user data of optical disc is added with a plurality non-user data called "Parity Byte" generated by Reed-Solomon code algorithm. Several user byte data in one sector and its parity byte form one unit called "RS codeword". Normally, one sector data has a plurality of RS codewords according to the physical specification of optical disc. The ECC decoder of optical drive could perform error correction codeword by codeword to correct the error resulting from noise and to improve correctness of user sector data. Beside that, in order to confirm reliability of user data sector, EDC (Error detection code) is also recorded with one sector data. Normally, the EDC value is following immediately after the user data in one sector. No matter whether error correction is performed or not, the EDC detector of optical drive could perform error detection to confirm reliability of user data in one sector.

For BD-RE disc, the disc fundamental information includes DDS (Disc Definition Structure) and DFL (Defect List). The area for storing DDS and DLS is called DMA (Disc Management Area). Normally, the optical drive must first read DDS sector and DFL sectors in BD-RE disc successfully, then the drive could identify the data layout of disc and mount this optical disc. The DDS sectors and DFL sectors, as the same as fore-mentioned structure of the user sector data, comprise ECC for improving correctness of user data and EDC for confirming reliability of user data. To enhance the robustness of disc accessing, the disc fundamental information is replicated to be respectively stored on different sectors of an optical disc. According to physical specification of BD-RE, there are 2 DMA in the inner ring called DMA1 and DMA2 and 2 DMA in the outer ring called DMA3 and DMA4. The contents of DMA1, DMA2, DMA3 and DMA4 are the same logically in normal case (i.e. DDS and DFL of 4 DMA have the same content in normal case).

In the conventional method, no matter error correction is performed or not, if calculated EDC value of DDS sector does not match the recorded EDC value stored in the optical disc, reading of the DDS sector is determined to have failed, and no correct disc fundamental information is generated as a basis for accessing the optical disc. In such a situation, the user data recorded in the optical disc cannot be read because of no correct information of disc layout. It is therefore a need to improve the probability of successful disc mounting for the optical discs having defects.

BRIEF SUMMARY OF THE INVENTION

According to the specification of the optical disc, there is a situation that only some of the RS codewords of the DDS sector contain meaningful data defined by the specification. The present invention improves the conventional disc mounting process by referencing the specification of the DDS sector to increase probability for successfully reading DDS information (such as disc fundamental information) from the DDS sector or others. The present invention can be implemented to any optical data storage medium by referencing specifications of the optical data storage medium, to enhance the probability of successfully obtaining data stored in defect area of the medium.

The invention provides a method for reading information of an optical data storage medium comprising a plurality of sectors. First, at least one sector is obtained. The sector is then decoded to check if the sector is reliable. When the sector is not reliable, a data rescue process based on a specification of the sector is performed on the sector in order to obtain information of the optical data storage medium.

The invention also provides a driving circuit for driving a reading operation of an optical drive. In one embodiment, the driving circuit comprises a read channel and a data processing unit. The read channel receives data including at least one sector from an optical disc. The data processing unit retrieves information from the data read by the read channel by checking whether the sector is reliable, and performing a data rescue process referring to the physical specification when the sector is not reliable.

The invention also provides a method for reading information from an optical data storage medium comprising a plurality of codewords. First, at least one codeword which comprises spec-defined fields whose formats are defined by a specification of the data storage medium as a spec-defined codeword is determined. Whether the spec-defined codeword is reliable is then determined. When the spec-defined codeword is not reliable, data stored in the spec-defined fields of the spec-defined codeword is modified according to the specification to generate a modified codeword. Then, if an error correction result of the modified codeword is successful, this modified codeword is treated as a valid codeword.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 shows a physical specification of a DDS sector of a DVD-RAM disc;

FIG. 9B is a schematic diagram of an address format of a DVD minus disc; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
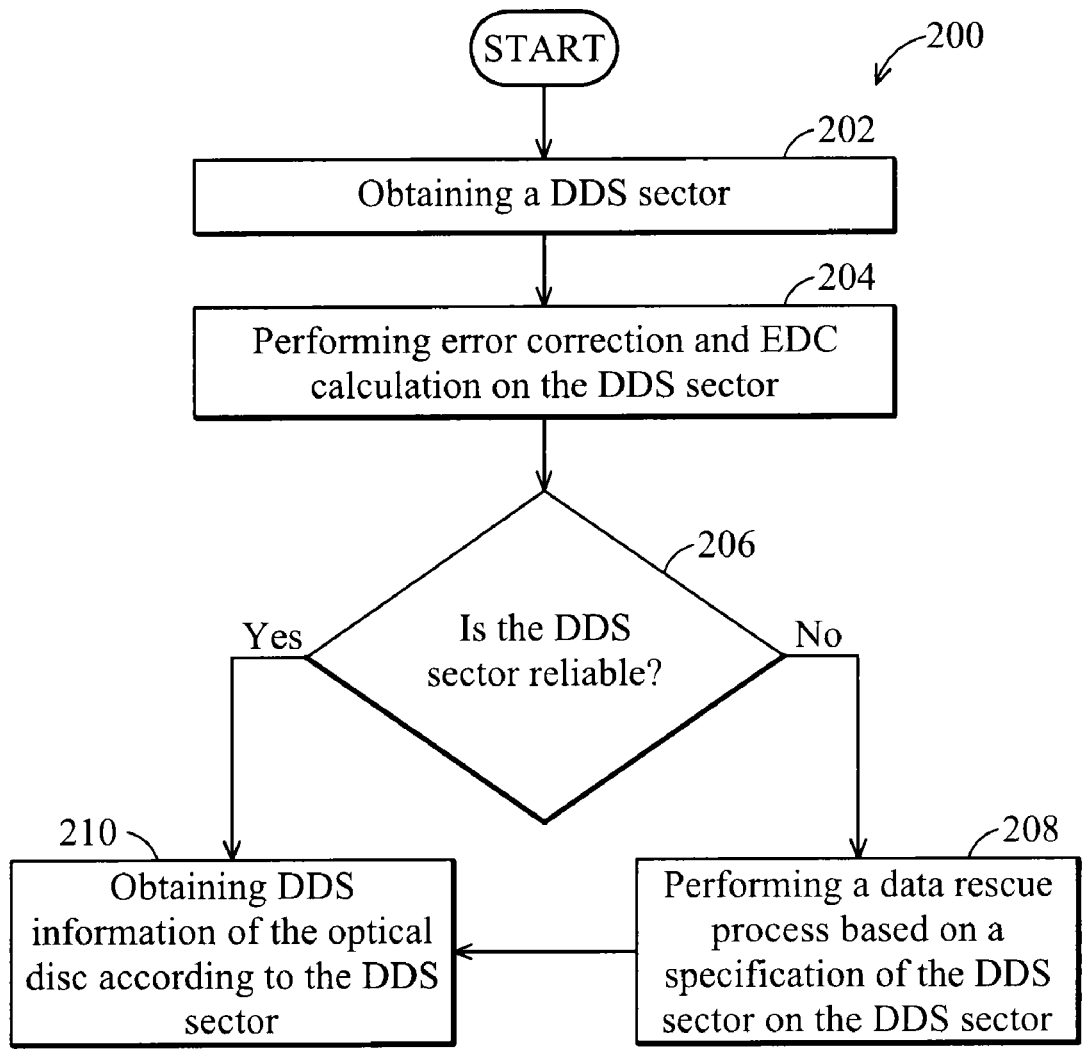
FIG. 1A is a flowchart of a method for reading lead-in information of an optical disc according to the invention.
Figure 1B:
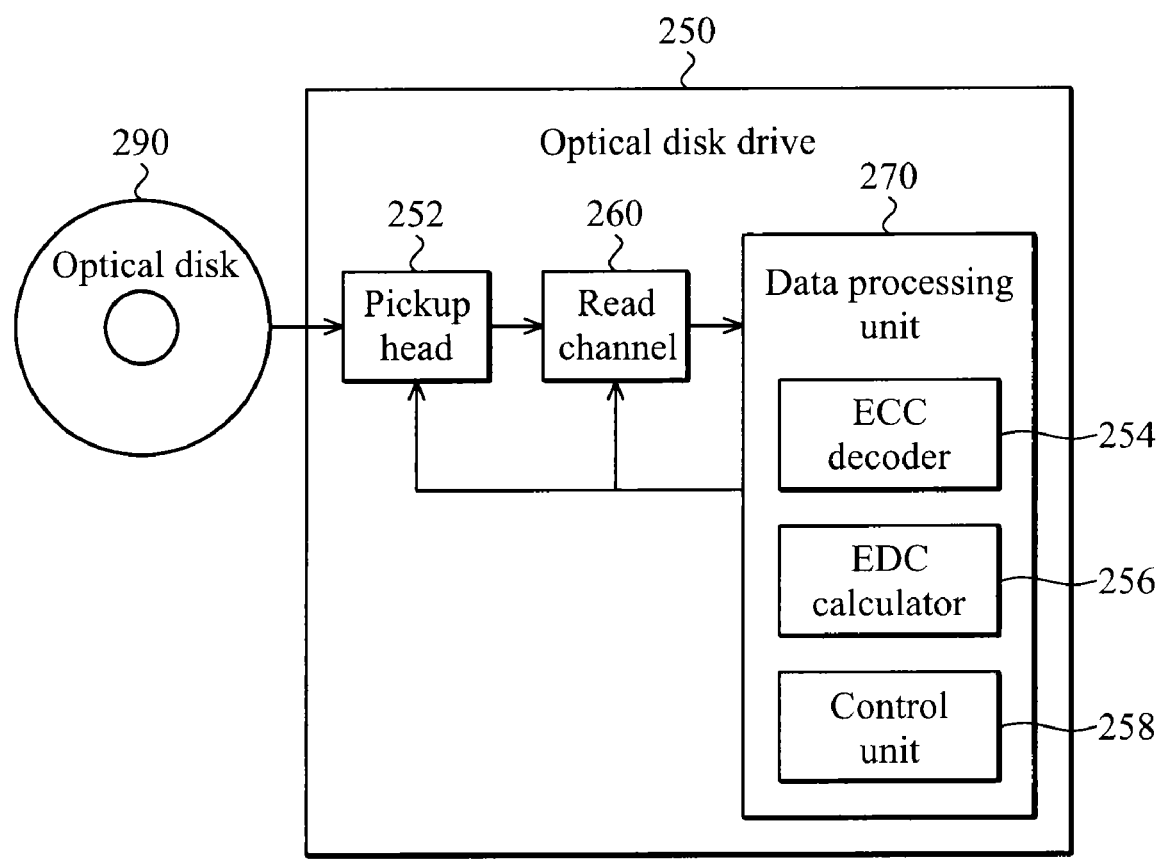
FIG. 1B is a block diagram of an optical drive according to the invention.

In the conventional method, no matter error correction is performed or not, if calculated EDC value of the DDS sector does not match recorded EDC value, reading of the DDS sector is determined to have failed. For BD-RE or DVD-RAM, if reading DDS of 4 DMA area fails, mount failure of optical disc is reported by optical drive to host or a user. Besides, if one of the 4 DMA is decoded fail, the optical drive has risk to mount this optical disc according to the contents of other decoding pass DMA because this decoding fail DMA may contain the newest DDS. The conventional method lacks flexibility. Referring to FIG. 1A, a flowchart of a method 200 for reading DDS information of an optical disc according to one embodiment of the invention is shown. In one embodiment, the DDS information is disc fundamental information of BD-RE or DVD-RAM disc. DDS information can be obtained according to the method 200 with more flexibility. Referring to FIG. 1B, a block diagram of an optical drive 250 according to one embodiment of the invention is shown. In this embodiment, the optical drive 250 comprises a pickup head 252, a read channel 260 and a data processing unit 270. The data processing unit comprises but not limited to an error correction code (ECC) decoder 254, an error detection code (EDC) calculator 256 and a control unit 258. Please be noted that some circuits such as memory are omitted here for brevity. In one embodiment, the optical drive 290 is a blu-ray disc (BD) drive or a digital versatile disc (DVD) drive.

Please refer to FIG. 1A in conjunction with FIG. 1B. First, the optical drive 250 reads the optical disc 290 to obtain data including at least one DDS sector (step 202) through pickup head 252 and read channel 260. The DDS sector comprises a plurality of error correction codewords. In one embodiment, the error correction codewords are Reed-Solomon (RS) codewords. When the optical disc 290 is a blu-ray disc, the DDS sector comprises 10 error correction codewords. When the optical disc 290 is a DVD-RAM disc, the DDS sector comprises 12 error correction codewords. The ECC decoder 254 then performs error correction process on a plurality of codewords of the DDS sector, and the EDC calculator 256 performs an EDC calculation to generate a calculated EDC value (step 204). The decoding result of the codewords may fail. The control unit 258 determines whether the DDS sector is reliable by checking whether the calculated EDC value matcher a recorded EDC value or not (step 206).

When the DDS sector is determined to be not reliable (step 206), the control unit 258 performs a data rescue process referring to information or format of the DDS sector pre-defined in the physical specification (step 208). Detailed steps of the data rescue process are further described in FIGS. 2, 4, 5, 6A, 6B, 7 and 8. After the data rescue process is performed, the control unit 258 can then obtain correct DDS information of the optical disc according to the DDS sector (step 210)

Briefing the step 208 and step 210 according to one embodiment of the present invention, the control unit 258 first determines codewords which comprise spec-defined fields (or meaningful fields) whose formats are defined by the specification of the DDS sector as spec-defined codewords, and checks whether the error correction results of the spec-defined codewords are successful. When the ECC decoder 254 indicates that the error correction results of the spec-defined codewords are successful, the control unit 258 decides that the DDS sector is reliable and provides the optical drive 250 with DDS information according to the spec-defined codewords. Moreover, the control unit 258 may further checks whether data stored in the spec-defined fields of the spec-defined codewords conforms to the specification of the DDS sector. When the error correction results of the spec-defined codewords are successful and the data stored in the spec-defined fields of the spec-defined codewords conform to the specification, the control unit 258 decides that the DDS sector is reliable and retrieving of DDS information could be treated as success even spec-undefined codewords do not pass the error correction process or calculated EDC values of the spec-undefined codewords do not match recorded EDC values This fore-mentioned statement is based on one sector have 2048 user byte while usually not all user data are used or defined by the physical specification. The non-interested data (spec-undefined data or null data in the physical specification) could be ignored in this flow 200 even they are not error-corrected successfully. Please note that, the control unit 258 may first descramble the DDS sector to obtain the data stored in the spec-defined fields of the spec-defined codewords.

In some embodiments, interested data may not necessarily be spec-defined data. Take DMA as an example. In order to enhance the robustness, four DMAs are recorded in different areas of the optical disc 290. Each DMA comprises an updating counter for identifying which DDS contains the newest information. When the optical disc 290 is accessed and one of the DDS cannot be read successfully, the data processing unit 270 determines whether a 4 bytes updating counter of the defected DDS is reliable. The flow 200 enters step 208 when the updating counter is determined to be unreliable, and the control unit 258 enables the data rescue process to recover the content of the updating counter of the defect DDS. The control unit 258 then compares the recovered updating counter obtained by the data rescue process with updating counters of other three DMAs obtained by normal decoding process. When the recovered updating counter of the defect DMA is less than or equal to any of the updating counters of other DMAs, the decoding failure of the defect DMA is ignored because this defect DMA does not contain the newest data and the optical drive 250 accesses the optical disc 290 according to the DMA which has the largest updating counter. When the recovered updating counter is larger than other updating counters, however, the optical drive 250 may determine that disc mounting fails, or the control unit 258 may perform data rescue process on the defect DDS in order to try to recover data stored in the defect DDS. If the data rescue process succeeds, the optical drive 250 accesses the optical disc 290 according to the information obtained from the data rescue process. The probability of successful accessing and mounting optical disc by optical drive is thereby increased.

Figure 2:
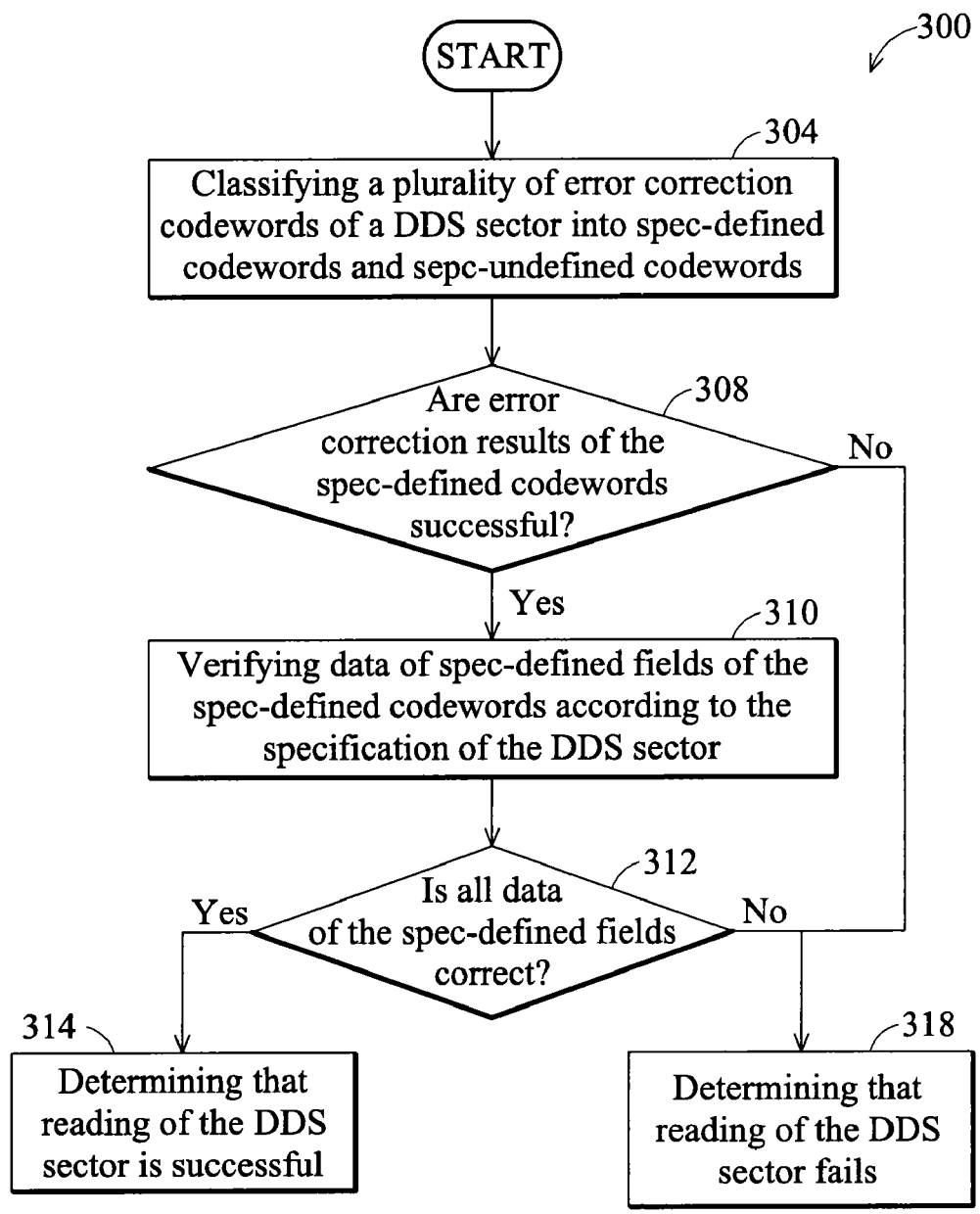
FIG. 2 is a flowchart of a first embodiment of a method for performing a data rescue process according to the invention.

Referring to FIG. 2, a flowchart of a first embodiment of a method 300 for performing a data rescue process according to the invention is shown. First, the control unit 258 classifies the codewords of the DDS sector into spec-defined codewords and spec-undefined codewords (step 304). Spec-defined codewords comprise spec-defined fields whose formats are defined by a specification of the DDS sector, and spec-undefined codewords comprise no spec-defined fields. For BD-RE, a DDS sector (2048 Bytes) of a BD-RE disc contains 10 error correction codewords. According to the physical specification of BD-RE, because only the first 96 bytes of data contents of the DDS sector are defined by the specification, only a first error correction codeword of the 10 error correction codewords of the DDS sector is a spec-defined codeword, and the other error correction codewords are spec-undefined codewords. Referring to FIG. 3, a physical specification of a DDS sector of a DVD-RAM disc is shown. A DDS sector of a DVD-RAM disc contains 12 error correction codewords. According to the physical specification of DVD-RAM, because only the first 395 bytes of data contents of the DDS sector are defined by the specification, only the first, second, and third error correction codewords of the 12 error correction codewords of the DDS sector are spec-defined codewords.

Because only the spec-defined codewords contains meaningful DDS information, decoding failure of the spec-undefined codeword leads to no loss in DDS information and can be ignored. The control unit 258 then determines whether error correction results of all the spec-defined codewords are successful (step 308). If not, reading of the DDS sector is still determined to have failed (step 318). If all error correction of the spec-defined codewords have been successful (step 308), the control unit 258 verifies data of spec-defined fields of the spec-defined codewords according to a specification of the DDS sector (step 310). When data of the spec-defined fields of the spec-defined codewords conforms to the specification, the control unit 258 determines the data of the spec-defined fields to be correct (step 312). In one embodiment, the control unit 258 compares the data stored in the identifiers or reserved fields of the DDS sector with the specification. For example, if the control unit 258 finds that the data stored in the reserved fields are zero, it determines the spec-defined fields conform to the specification and are reliable. When all data of the spec-defined fields of the spec-defined codewords is correct, the DDS information can be obtained, therefore the control unit 258 determines reading of the DDS sector is successful (step 314). Please note that steps 310 and 312 are considered as a double check process, and therefore are inessential.

Figure 4:
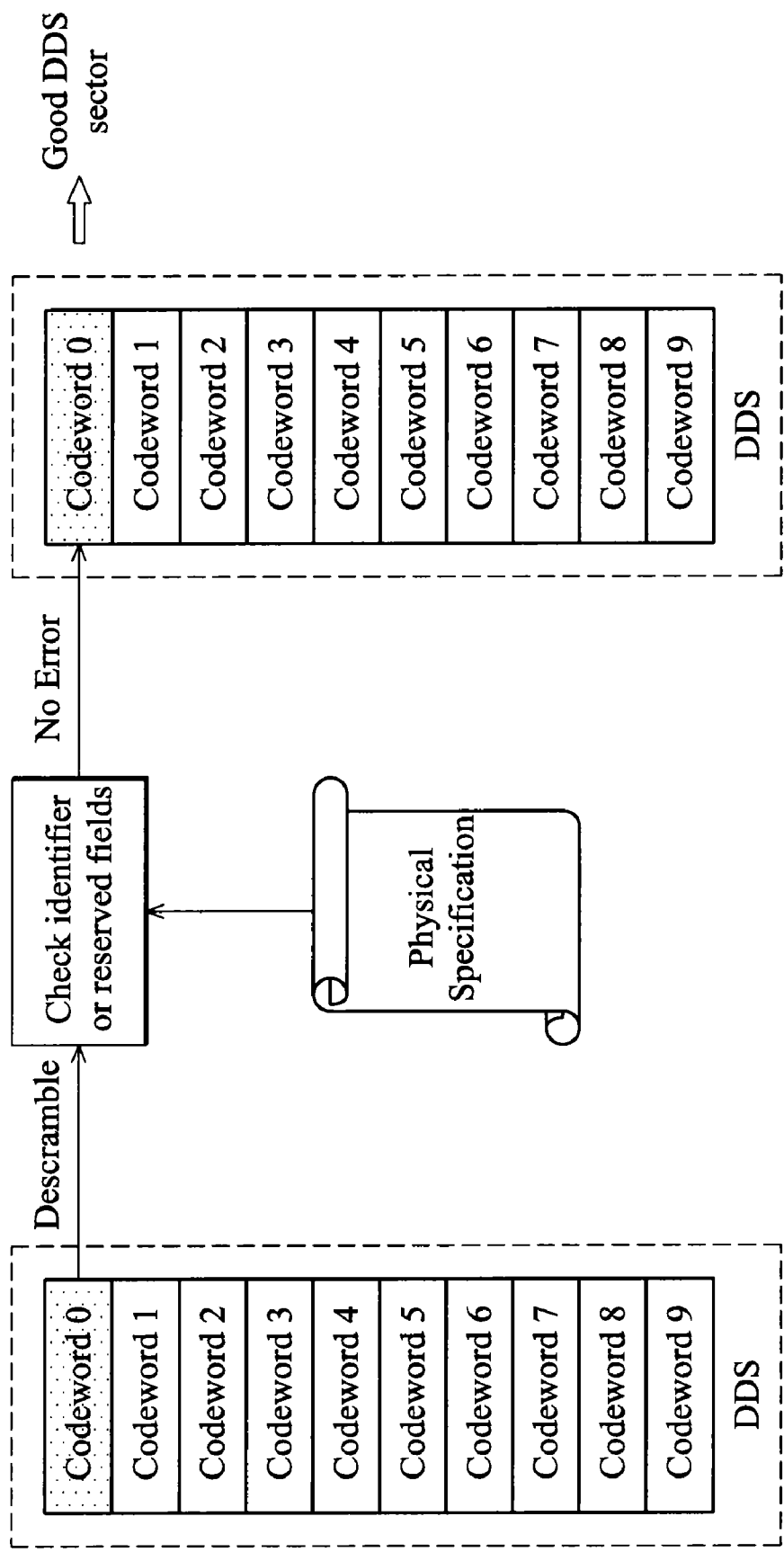
FIG. 4 is a schematic diagram of an embodiment of the data rescue process of FIG. 3.
Figure 5:
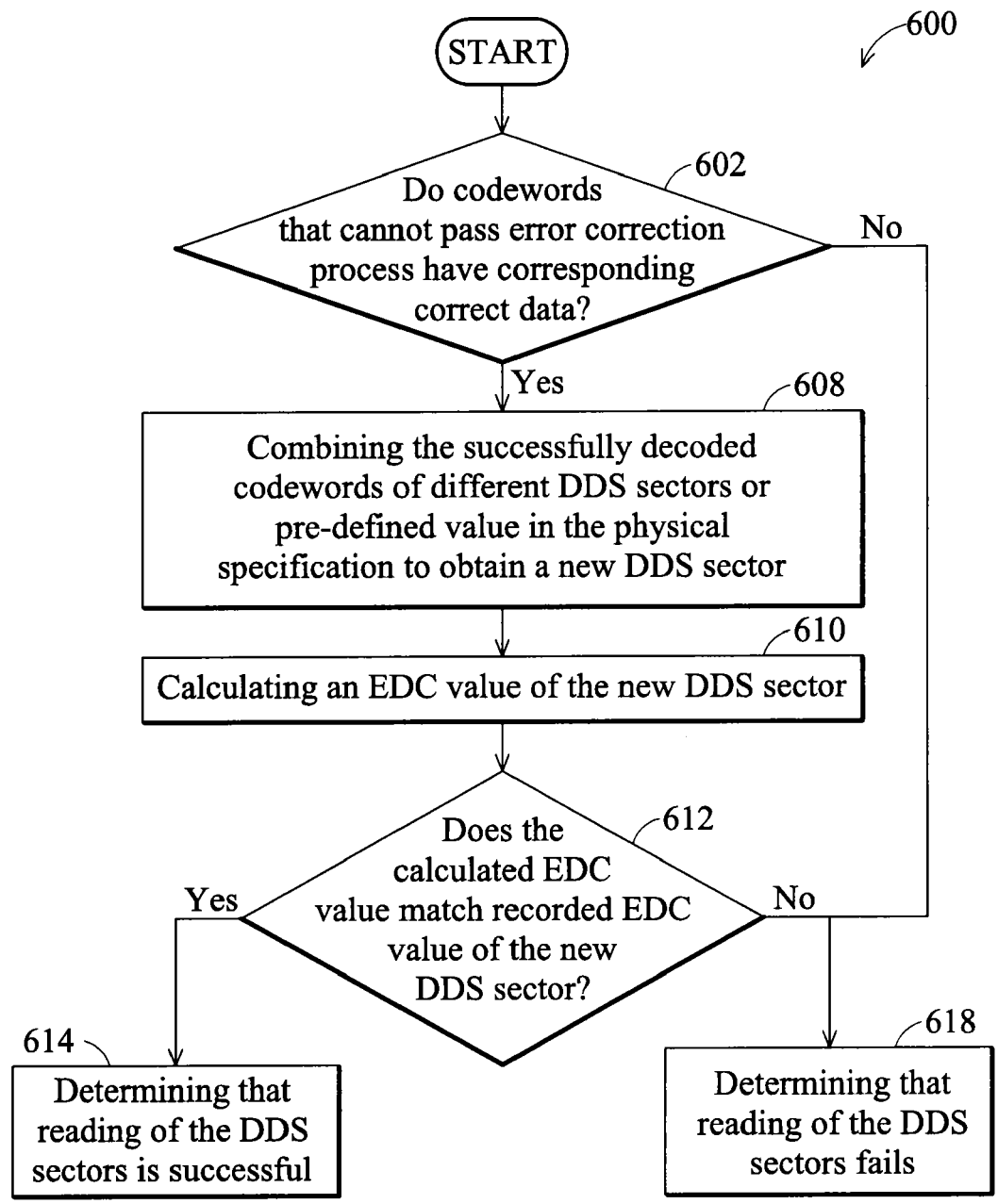
FIG. 5 is a flowchart of a second embodiment of a method for performing a data rescue process according to the invention.

Referring to FIG. 4, a schematic diagram of an embodiment of the data rescue process 300 of FIG. 5 is shown, where BD-RE is taken as example. A DDS sector comprises 10 error correction codewords 0~9, and only the first error correction codeword 0 is a spec-defined codeword in this embodiment. When the error correction results of some of the codeword 1~9 are not successful, the conventional method 100 would determine reading of the DDS sector to have failed as the calculated EDC values would not match the recorded EDC values. In contrast, as long as the error correction result of the first codeword 0 is successful and contents of spec-defined fields of the first codeword 0 conform to the physical specification of the DDS sector after the first codeword 0 is descrambled, if necessary, the control unit 258 determines that reading of the DDS sector is successful according to the data rescue process 300. Since spec-undefined codewords do not contain meaningful data to disc mounting, decoding failure of spec-undefined codewords could be ignored. The data rescue process 300 therefore has higher probability and flexibility to obtain reliable DDS information stored in a defect sector without performance degradation.

Referring to FIG. 5, a flowchart of a second embodiment of a method 600 for performing a data rescue process according to the invention is shown. The optical drive 250 can still obtain DDS information from decoding failure DDS by referring to some correct information of other DDS sectors. When any one of the DDS sectors cannot provide the optical drive 250 with correct DDS information, the optical drive 250 performs the data rescue process 600 shown in FIG. 6.

The control unit 258 of the optical drive 250 first determines whether codewords that do not pass the error correction process of a DDS sector have corresponding correct data by referring to other reduplicated DDS or pre-define data value in physical specification (step 602). If so, the control unit 258 collects desired codewords from the correct codewords of the other DDS sectors and then combines the correct codewords of different DDS sectors to form a new DDS sector (step 608). After the new DDS sector is obtained, the EDC calculator 256 calculates EDC value of the new DDS sector (step 610). If the calculated EDC value matches recorded EDC value (step 612), the DDS information retrieved from the new DDS sector is determined to be reliable. Reading of the DDS sectors is therefore determined to have been successful (step 614). Otherwise, if the calculated EDC value does not match the recorded EDC value (step 612), the DDS information retrieved from the new DDS sector is determined to be wrong. Reading of the DDS sectors is therefore determined to have failed (step 618).

Figure 6A:
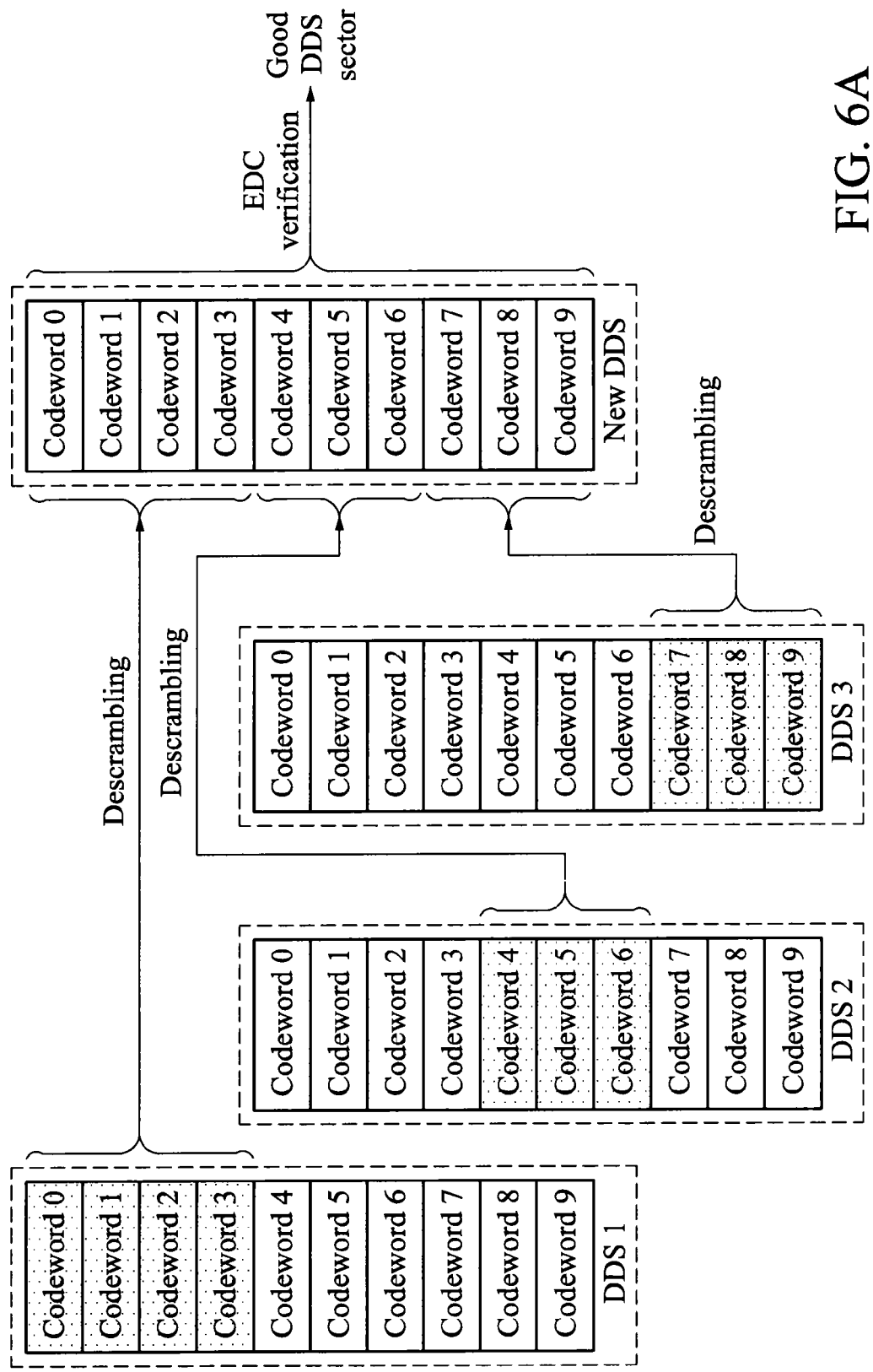
FIG. 6A is a schematic diagram of a first embodiment of the data rescue process of FIG. 5.

Referring to FIG. 6A, a schematic diagram of a first embodiment of the data rescue process 600 of FIG. 5 is shown. Three DDS sectors 1, 2, and 3 store the same DDS information in this embodiment. Each of the DDS sectors 1, 2, and 3 comprises codewords 0~9. When the ECC decoder 254 indicates the control unit 258 detects that only the codewords 0~3 of the DDS sector 1 have been successfully corrected, the codewords 4~6 or all codewords of the DDS sector 2 have been successfully corrected, and the codewords 7~9 or all codewords of the DDS sector 3 have been successfully corrected, the control unit 258 combines the desired codewords 0~3 of the DDS sector 1, the desired codewords of the DDS sector 2 (e.g., the codewords 4~6), and the desired codewords of the DDS sector 3 (e.g., codewords 7~9) to obtain a new DDS sector. The EDC calculator 256 then calculates EDC value of the new DDS sector. If the calculated EDC value matches recorded EDC value, the new DDS sector is determined as a good DDS sector.

Figure 6B:
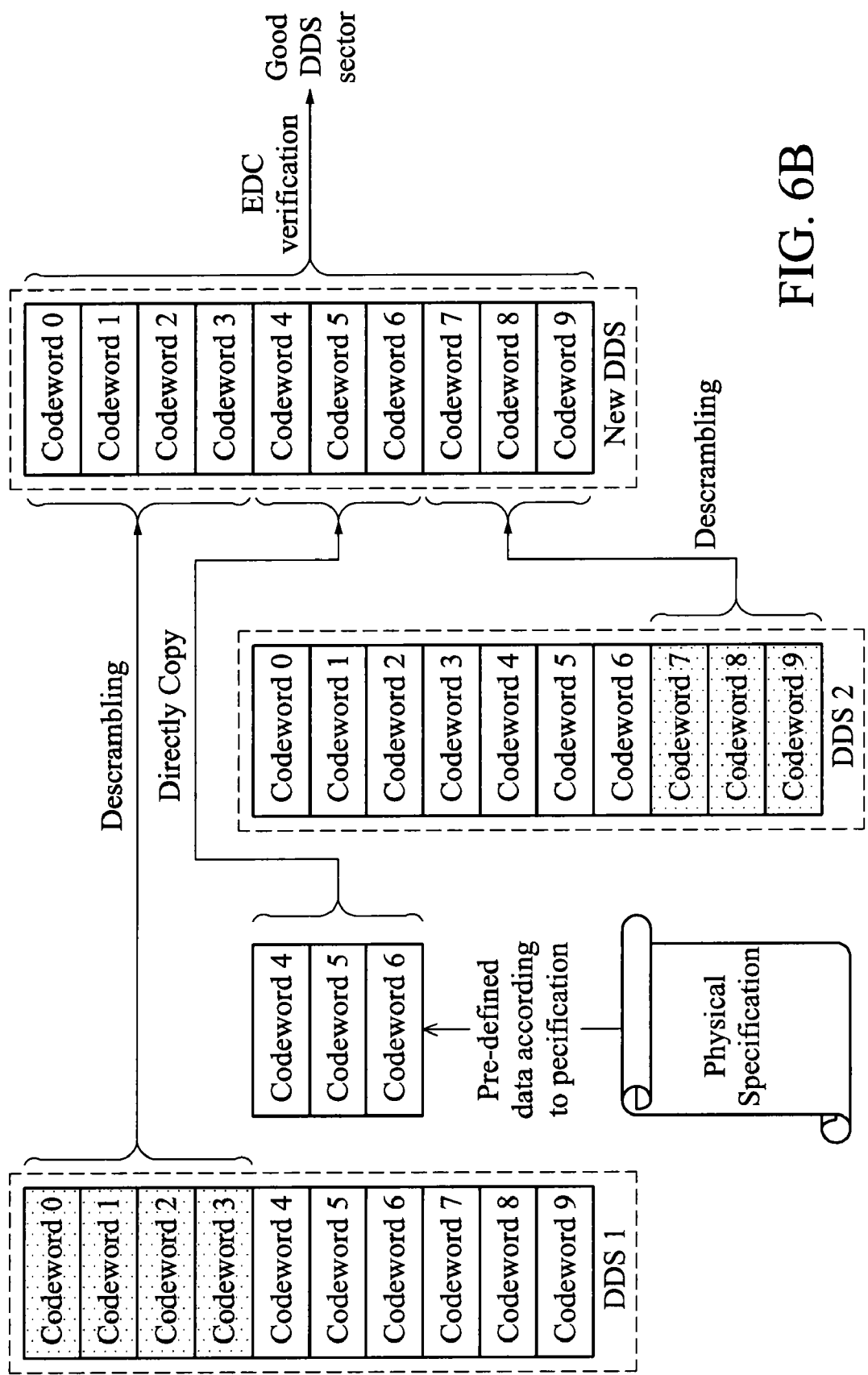
FIG. 6B is a schematic diagram of a second embodiment of the data rescue process of FIG. 5.

Referring to FIG. 6B, a schematic diagram of a second embodiment of the data rescue process 600 of FIG. 5 is shown. Two DDS sectors 1 and 2 store the same DDS information in this embodiment. Each of the DDS sectors 1 and 2 comprises codewords 0~9. When the ECC decoder 254 indicates that only the codewords 0~3 of the DDS sector 1 have been successfully corrected and the codewords 7~9 or all codewords of the DDS sector 2 have been successfully decoded, the control unit 258 combines the desired codewords 0~3 of the DDS sector 1 with the desired codewords of the DDS sector 2 (e.g., the codewords 7~9) to obtain a new DDS sector at step 608, the new DDS sector still lacks codewords 4~6. The control unit 258 further generates the missing codewords 4~6 required to form the new DDS sector by referencing pre-defined data of the physical specification if the fields of the missing codewords 4~6 are defined by the specification. The EDC calculator 256 then calculates an EDC value of the new DDS sector. If the calculated EDC value matches recorded EDC value, the new DDS sector is determined as a good DDS sector.

Figure 7:
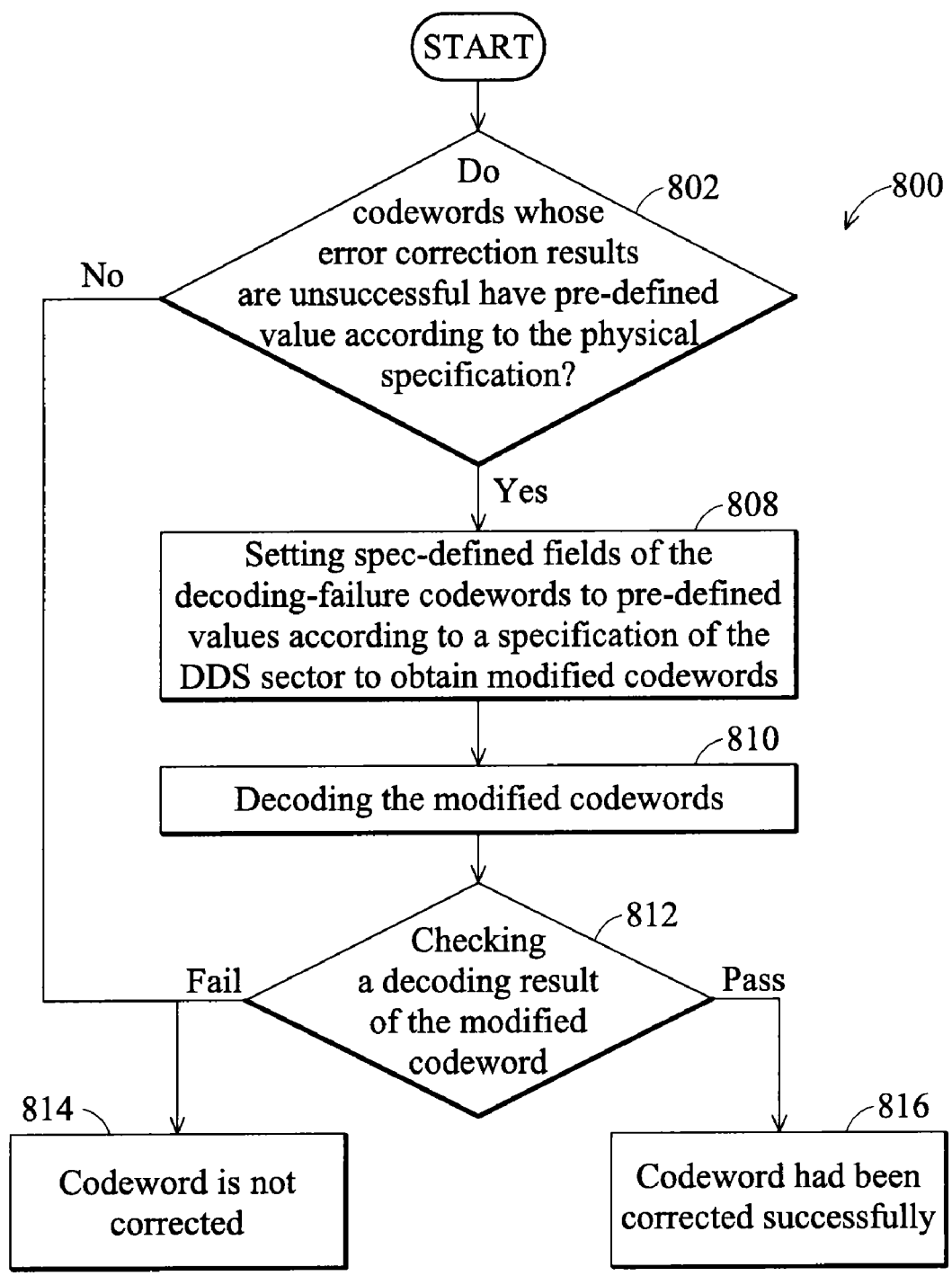
FIG. 7 is a flowchart of a third embodiment of a method for performing a data rescue process according to the invention.

Referring to FIG. 7, a flowchart of a third embodiment of a method 800 for performing a data rescue process according to the invention is shown. Assume that a DDS sector of the optical disc 290 is read by the optical drive 250, and not all of error correction codewords of the DDS sector can be successfully corrected (that is, not all of the codewords of the DDS sector can pass the error correction process). The optical drive 250 can perform the data rescue process 800 codeword by codeword. First, the control unit 258 determines whether codewords whose error correction results are unsuccessful of the DDS sector have pre-define value (e.g., have spec-defined fields) according to the physical specification. If not, the rescuing procedure of these decoding failure codewords would be terminated. If yes, the control unit 258 then sets the spec-defined fields of the decoding-failure codewords with values determined according to the specification to obtain modified codewords (step 808). The modified codewords are decoded (step 810) again. By setting the spec-defined fields of the modified codewords with values defined by the specification, the errors occur on the spec-defined fields need not to be corrected by ECC decoder 254. The error correction of the modified codewords are further used to correct other error bits to improve correction ability of these codeword. Therefore, the data rescue process 800 in comparison with the original decoding process provides better error tolerance. The corrected successfully codeword could be used in aforementioned two embodiment shown in FIGS. 2, 4, 5, 6A and 6B.

Figure 8:
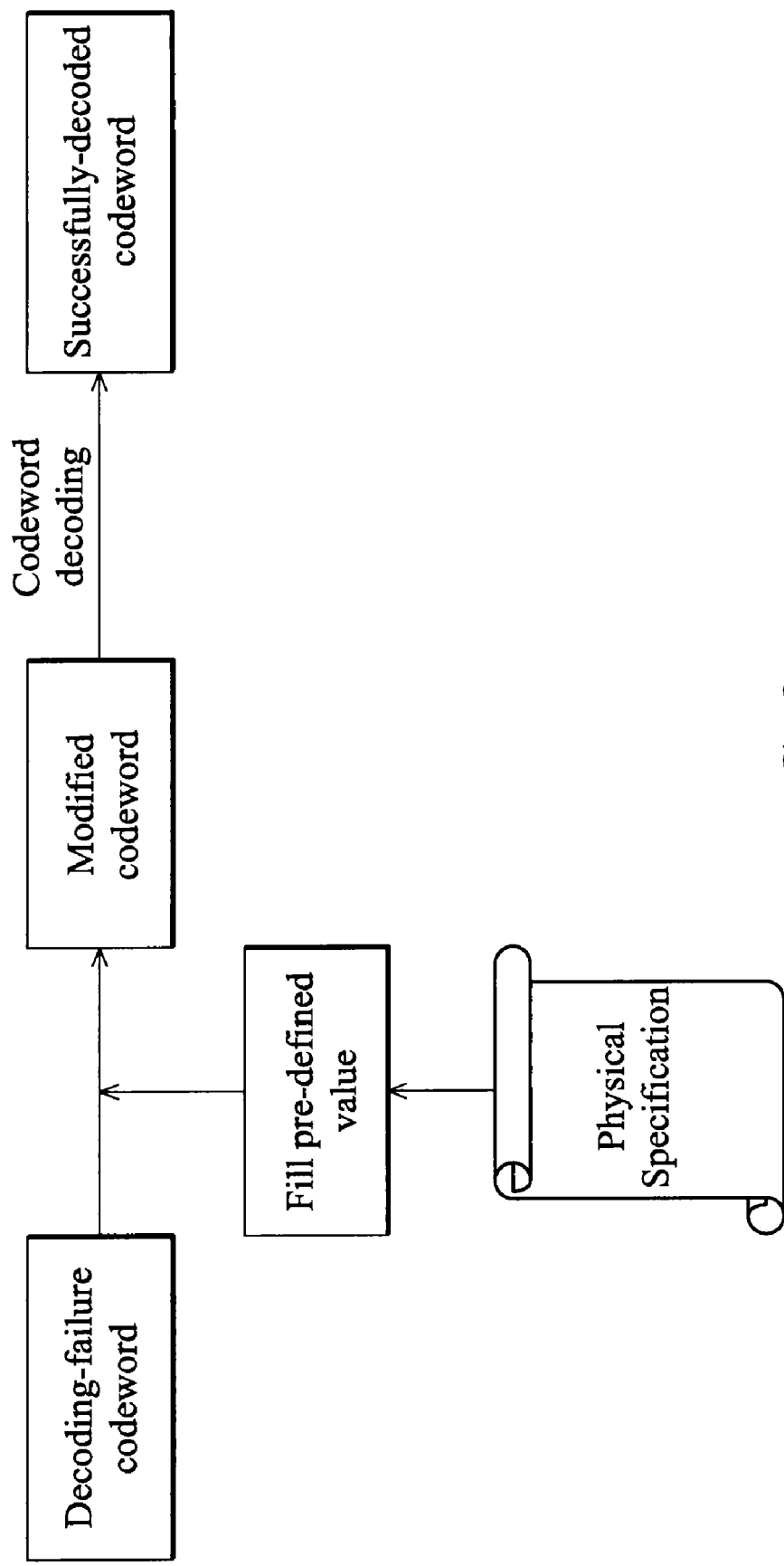
FIG. 8 is a schematic diagram of an embodiment of the data rescue process of FIG. 7.

Referring to FIG. 8, a schematic diagram of an embodiment of the data rescue process 800 of FIG. 7 is shown. The decoding-failure codeword shown in FIG. 8 refers to a codeword that cannot be successfully decoded by the optical drive 250. The control unit 258 determines spec-defined fields of the decoding-failure codeword, and then fills the spec-defined fields of the decoding-failure codeword with pre-defined values determined according to the physical specification. A modified codeword is therefore obtained. The optical drive 250 then decodes the modified codeword. If codeword decoding is successful, the information stored in the modified codeword can then be obtained as reference for accessing the optical disc 290.

Figure 9A:
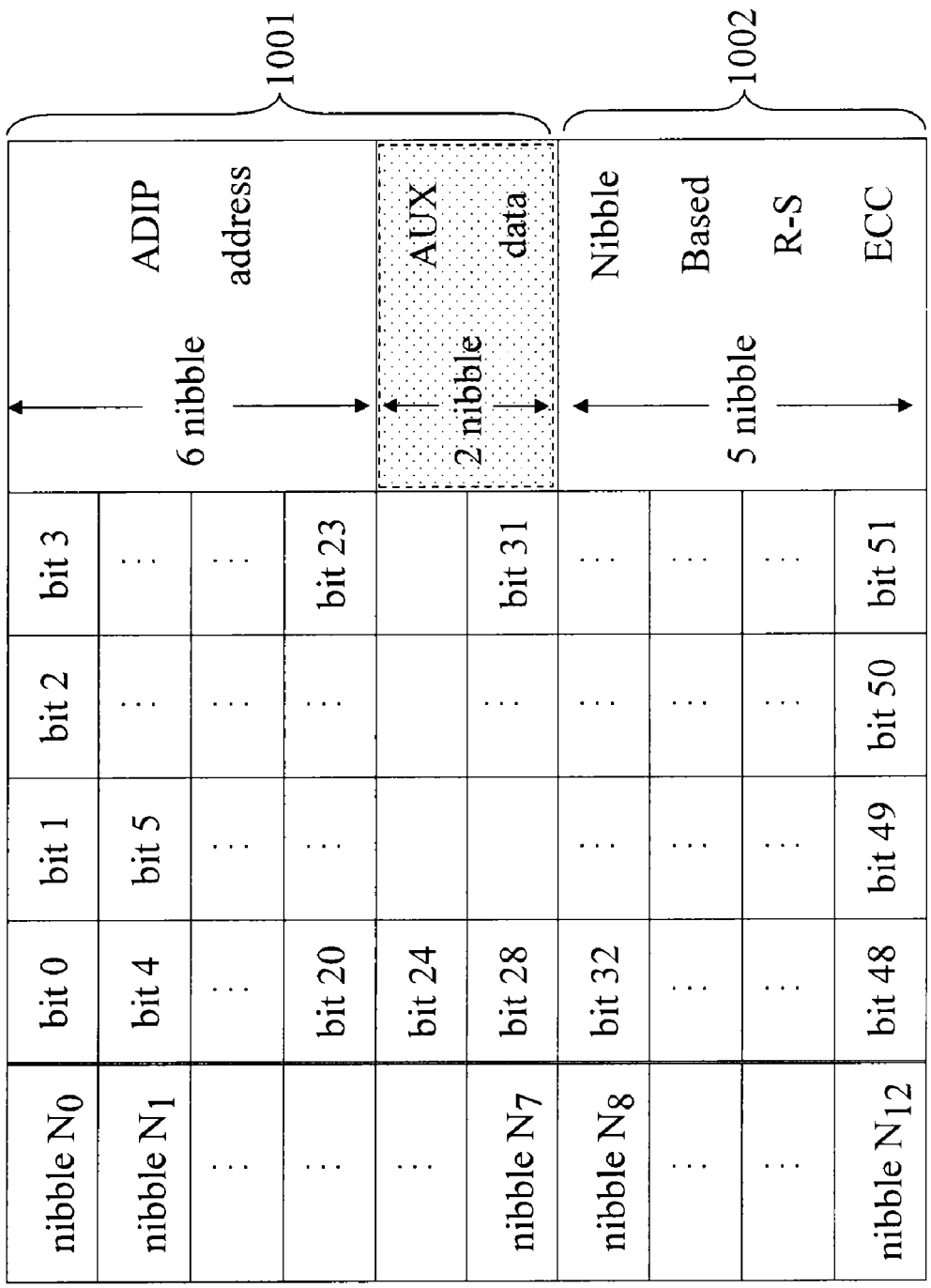
FIG. 9A is a schematic diagram of an address format of a DVD plus disc.

The data rescue process 800 of FIG. 7 can also be used to decode an address of an optical disc. When address data cannot be decoded, spec-defined fields of the address data can first be set to values determined according to a specification of the address data. Then, decoding of the address data can be performed again. Because errors occur on the spec-defined fields of the modified address data are corrected by the data rescue process instead of by error correction process, the modified address data would have better error tolerance. Referring to FIG. 9A, a schematic diagram of an address format of a DVD plus disc is shown. The address data of the DVD plus disc comprises source data 1001 of 8 nibbles and parity data 1002 of 5 nibbles. The source data 1001 is divided into an ADIP address of 6 nibbles and auxiliary data of 2 nibbles. When the address data cannot be successfully decoded, the auxiliary data field is set with zero bits in most case to obtain modified address data. The modified address therefore has a greater chance to be successfully decoded according to the parity 1002.

Referring to FIG. 9B, a schematic diagram of an address format of a DVD minus disc is shown. A part-B address comprises six source data bytes and three parity bytes. When the part-B address cannot be successfully decoded, the last three source data bytes 1011 are set to zero bits in most case to obtain a modified part-B address, so that the modified part-B address has a greater chance to be successfully decoded according to the three parity bytes.

Figure 9C:
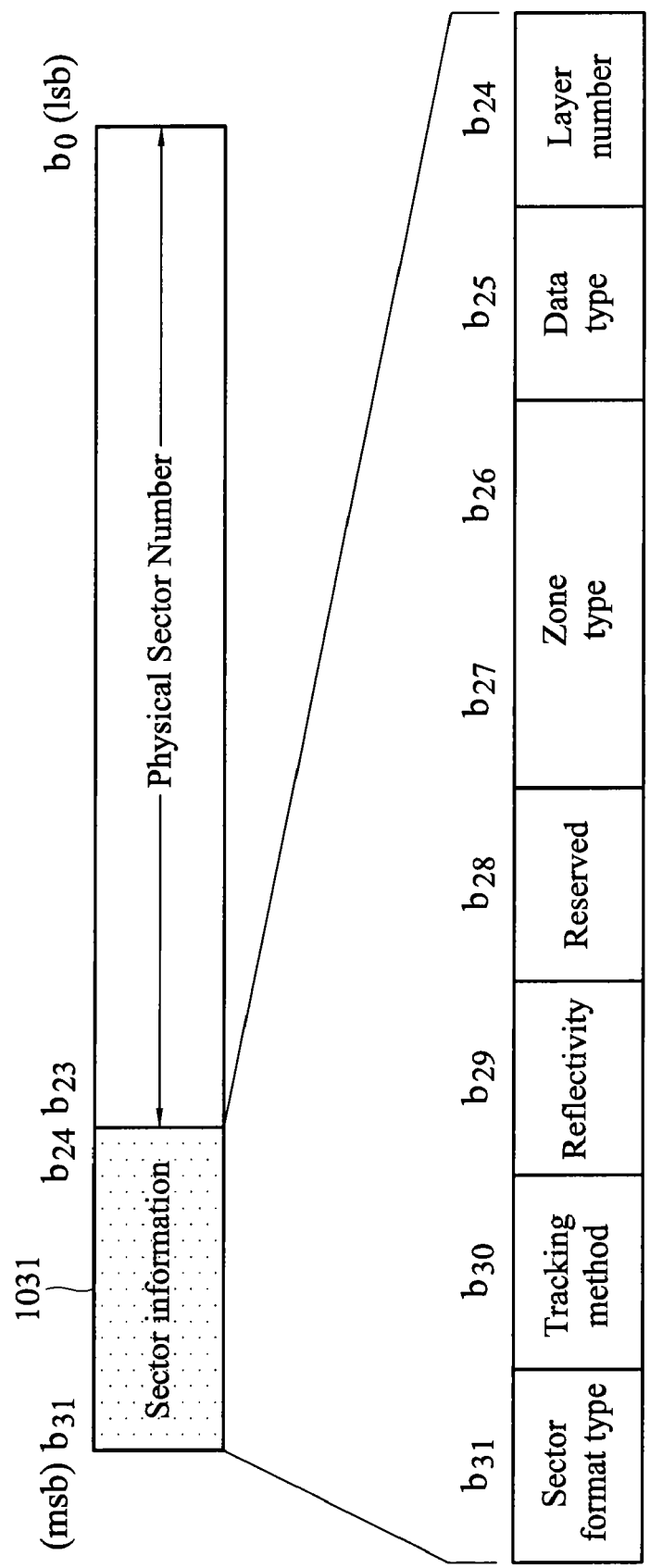
FIG. 9C is a schematic diagram of a logical address format of a DVD disc.

Referring to FIG. 9C, a schematic diagram of a logical address format of a DVD disc is shown. A DVD logical address comprises a physical sector number of bits $b_0$~$b_{23}$ and a sector information field of bits $b_{24}$~$b_{31}$. When a DVD logical address cannot be successfully decoded, the sector information field of bits $b_{24}$~$b_{31}$ can be set to default data bits to obtain a modified logical address, so that the modified logical address has a greater chance to be successfully decoded according to a parity. In another embodiment, when the BD logical address (AUN, Address unit) cannot be successfully decoded, the auxiliary data field 4 is set to zero bits in most case to obtain a modified logical address, so that the modified logical address has a greater chance to be successfully decoded according to a parity.

The present invention can be implemented to any optical data storage medium by referencing specifications of the optical data storage medium, to enhance the probability of successfully obtaining data stored in defect area of the medium.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reading information from an optical data storage medium, comprising:

obtaining at least one sector of the optical data storage medium; check if the sector is reliable; and when the sector is not reliable, performing a data rescue process based on a specification of the sector in order to obtain information of the optical data storage medium from the sector;

wherein the sector comprises a plurality of codewords, and the data rescue process comprises:

selecting at least one spec-defined codeword from the plurality of codewords, wherein the spec-defined codeword comprises a plurality of spec-defined fields are defined by the specification of the sector;

checking whether the spec-defined codeword is reliable; and when the spec-defined codeword is reliable, retrieving information from the spec-defined codeword.

2. The method as claimed in claim 1, wherein the step of checking whether the spec-defined codeword is reliable comprises:

checking whether an error correction result of the spec-defined codeword is successful;

checking whether data stored in the spec-defined fields of the spec-defined codeword conforms to the specification of the sector; and deciding that the spec-defined codeword is reliable when the error correction result of the spec-defined codeword is successful and the data stored in the spec-defined fields of the spec-defined codeword conforms to the specification.

3. The method as claimed in claim 1, wherein the data rescue process further comprises:
when the spec-defined codeword is not reliable, modifying data stored in the spec-defined fields of the spec-defined codeword according to the specification of the sector to generate a modified codeword, and retrieving information from the modified codeword if an error correction result of the modified codeword is successful.

4. The method as claimed in claim 1, wherein the information comprises disc fundamental information.

5. The method as claimed in claim 1, wherein the sector is a disc fundamental information sector reduplicated with copies in several area of the optical disc and the information comprises updating counter, and the method further comprising:
comparing the updating counter of the disc fundamental sector obtained by the data rescue process with updating counters of other reduplicated disc fundamental sectors in the optical data storage medium;
when the updating counter of the disc fundamental sector is less than or equal to any of the updating counters of other reduplicated disc fundamental sectors, accessing the optical data storage medium according to at least one of the reduplicated disc fundamental sectors; and
when the updating counter of the disc fundamental sector is larger than the updating counters of other reduplicated disc fundamental sectors, accessing the optical data storage medium according to the disc fundamental sector.

6. The method as claimed in claim 5, wherein the information is DDS, DFL or PAC of BD physical specification or DVD-RAM physical specification.

7. The method as claimed in claim 1, wherein when a plurality of sectors each comprising a plurality of codewords are obtained and determined to be not reliable, the data rescue process comprises:
collecting desired codewords at least from codewords having successful error correction of the sectors;
combining the desired codewords to form a new sector; and
obtaining information according to the new sector.

8. The method as claimed in claim 7, wherein the step of obtaining information according to the new sector comprises:
determining whether the new sector is reliable by comparing calculated EDC value and recorded EDC value and when the new sector is determined to be reliable, obtaining the information by retrieving data from the new sector.

9. The method as claimed in claim 7, wherein the data rescue process further comprises:
generating at least one new codeword which comprises spec-defined data according to the specification of the sector, wherein the value of the spec-defined data is defined by the specification of the sector;
and the combination to form the new sector comprises:
combining collected desired codewords with the new codeword to form the new sector.

10. The method as claimed in claim 7, wherein the plurality of sectors have same format of data and are recorded in different areas of the optical disc according to the specification or according to behaviors of an optical drive.

11. The method as claimed in claim 1, wherein the sector comprises a plurality of codewords, and the data rescue process comprises:
setting at least one spec-defined field of at least one codeword of a DDS sector with data determined according to the specification of the DDS sector to obtain at least one modified codeword;
checking whether an error correction result of the modified codeword is successful;
wherein the spec-defined fields are defined by the specification of the sector.

12. A driving circuit for driving a reading operation of an optical drive, comprising:
a read channel, for receiving data comprising at least one sector from an optical disc; and
a data processing unit, coupled to the read channel, for retrieving information from the data read by the read channel, wherein the data processing unit checks whether the sector is reliable, and performs a data rescue process referring to a physical specification of the sector when the sector is not reliable in order to retrieve information from the sector;
wherein the sector comprises a plurality of codewords, and the data processing unit selects at least one spec-defined codeword from the plurality of codewords checks whether the spec-defined codeword is reliable, obtains information according to the spec-defined codeword when the spec-defined codeword is reliable, thus performing the data rescue process, wherein the spec-defined codeword comprises a plurality of spec-defined fields defined by the specification of the sector.

13. The driving circuit as claimed in claim 12, wherein the data processing unit checks whether an error correction result of the spec-defined codeword is successful, checks whether data stored in the spec-defined fields of the spec-defined codeword conforms to the specification of the sector, and decides that the spec-defined codeword is reliable when the error correction result of the spec-defined codeword is successful and the data stored in the spec-defined fields of the spec-defined codeword conforms to the specification, thus checking whether the spec-defined codeword is reliable.

14. The driving circuit as claimed in claim 12, wherein when the spec-defined codeword is not reliable, the data processing unit modifies data stored in the spec-defined fields of the spec-defined codeword according to the specification of the sector to generate a modified codeword, and retrieves information according to the modified codeword if an error correction result of the modified codeword is successful and a calculated EDC value of the modified codeword matches a recorded EDC value, thus performing the data rescue process.

15. The driving circuit as claimed in claim 12, wherein when a plurality of sectors each comprising a plurality of codewords are obtained and determined to be not reliable, the data processing unit collects desired codewords at least from codewords having successful error correction of the sectors, combines the desired codewords to form a new sector, and obtains information according to the new sector if a calculated EDC value of the new sector matches a recorded EDC value, thus performing the data rescue process.

16. The driving circuit as claimed in claim 15, wherein the data processing unit generates at least one new codeword which comprises spec-defined data according to the specification of the sector to perform the data rescue process, and the data processing unit combines collected desired codewords with the new codeword to form the new sector, wherein the value of the spec-defined data is defined by the specification of the sector.

17. The driving circuit as claimed in claim 12, wherein the sector comprises a plurality of codewords, and the data processing unit sets at least one spec-defined field of at least one codeword of the sector with data determined according to the specification of the sector to obtain at least one modified codeword, checks whether an error correction result of the modified codeword is successful, and retrieves information from the sector when the error correction result of the modified codeword is successful and a calculated EDC value of the modified sector matches a recorded EDC value, thus performing the data rescue process; wherein the spec-defined fields are defined by the specification of the sector.

18. A method for reading information of an optical data storage medium comprising a plurality of codewords, comprising:

selecting at least one spec-defined codeword from the plurality of codewords, wherein the spec-defined codeword comprises a plurality of spec-defined fields defined by a specification of the sector;

determining whether the spec-defined codeword is reliable;

when the spec-defined codeword is not reliable, modifying data stored in the spec-defined fields of the spec-defined codeword according to the specification of the sector to generate a modified codeword; and obtaining information according to the modified codeword.

* * * * *